(12) United States Patent
Rossi

(10) Patent No.: US 7,382,408 B2
(45) Date of Patent: Jun. 3, 2008

(54) VARYING CAPACITANCE THAT RECEIVES SIGNALS FROM SENSING ELEMENTS

(75) Inventor: Giuseppe Rossi, Pasadena, CA (US)

(73) Assignee: Micron Technology, Inc., Boise, ID (US)

( * ) Notice: Subject to any disclaimer, the term of this patent is extended or adjusted under 35 U.S.C. 154(b) by 1301 days.

(21) Appl. No.: 10/197,552

(22) Filed: Jul. 18, 2002

(65) Prior Publication Data

US 2004/0012697 A1 Jan. 22, 2004

(51) Int. Cl.
*H04N 3/14* (2006.01)
*H04N 5/335* (2006.01)

(52) U.S. Cl. .................................... 348/308
(58) Field of Classification Search ............... 348/308
See application file for complete search history.

(56) References Cited

U.S. PATENT DOCUMENTS

| | | | |
|---|---|---|---|
| 5,959,485 A | 9/1999 | Roohparvar | |
| 6,166,367 A | 12/2000 | Cho | |
| 6,201,573 B1 * | 3/2001 | Mizuno | 348/308 |
| 6,204,524 B1 | 3/2001 | Rhodes | |
| 6,342,919 B2 * | 1/2002 | Opris | 348/241 |
| 6,407,440 B1 | 6/2002 | Rhodes | |
| 6,927,791 B2 * | 8/2005 | Kole | 348/223.1 |
| 6,977,682 B2 * | 12/2005 | Mizuno et al. | 348/241 |

* cited by examiner

*Primary Examiner*—James M. Hannett
(74) *Attorney, Agent, or Firm*—Dickstein Shapiro LLP

(57) ABSTRACT

Capacitance on a readout line is varied while receiving a signal, from a light sensing pixel or other sensing element through the line. Capacitance can be varied in accordance with a readout characteristic of the pixel, such as color sensed, conversion efficiency, or readout signal range. For example, a CMOS color image sensing array with pixels in an RGB Bayer pattern can include, for each column, a variable capacitance component with parallel switchable capacitors for signal sampling and readout sampling. The capacitors can all have equal values, or can be scaled in a binary format. The variable capacitance component can also include a constant capacitor. A controller can switch the capacitors to obtain capacitances that provide color equalization, and can use light level as well as pixel color for fine tuned color equalization. Sampled values from the capacitances can be provided in sequence to a readout amplifier at the beginning of a readout path to maintain signal-to-noise ratio. The readout amplifier's gain can depend on its input capacitance, which is determined by the switched capacitors to obtain color equalized output. In addition, the readout amplifier can block the effect of parasitic capacitance from column select switches. A second amplifier can perform further color equalization through variable gain. After an array is constructed, capacitor selection data can be obtained for each color and light level and used to program the controller.

25 Claims, 7 Drawing Sheets

VARYING CAPACITANCE THAT RECEIVES SIGNALS FROM SENSING ELEMENTS

BACKGROUND OF THE INVENTION

The invention relates to techniques for receiving signals from light sensing pixels or other sensing elements through a line. Particularly, the invention relates to methods, circuits, and systems that vary a capacitance that receives such signals. For example, capacitance may be varied in accordance with a readout characteristic of pixels, such as color sensed, conversion efficiency or readout signal range. Capacitance can be varied to perform color equalization at the input of a readout path.

Various types of sensing elements and configurations are known. For example, U.S. Pat. No. 6,204,524, incorporated herein by reference, describes CMOS active pixel sensor (APS) arrays and compares them to other semiconductor-based imagers, including charge coupled devices (CCDs), photodiode arrays, charge injection devices, and hybrid focal plane arrays.

In many known configurations, a number of sensing elements, often called "pixels", provide their signals through a line, sometimes referred to herein as a "readout line". In a row/column array, for example, each column typically has a readout line to receive signals from a group of pixels that includes one pixel from each row; when a row is selected, each pixel in the row can provide its signal through its column's readout line.

In some applications, sensing elements of different types provide signals on a shared readout line. For example, in a CMOS APS array for color image sensing, different sets of pixels receive and sense different colors due to filters over the pixels. Each pixel's filter passes light of only one color or wavelength range; with RGB filtering, some pixels receive red, others green, and others blue. In a typical array, pixels that receive different colors are arranged so that each readout line receives signals from pixels in more than one set.

As is well known, a pixel's quantum efficiency (QE) depends on the color sensed: For example, a blue pixel may have 40-60% lower QE than a green pixel, meaning that the blue pixel converts photons to charge less efficiently and therefore provides signals in a lower range than the green pixel. In a CMOS array on a silicon substrate, this phenomenon results from an inherent property of silicon, which, within the visible spectrum, converts green wavelength light at a higher efficiency and is least efficient at converting blue wavelength light. As a result, pixels that sense different colors provide signals with different characteristics.

Known techniques improve image quality by equalizing gain of signals from pixels that sense different colors. Color equalization of this type is typically performed before color interpolation or other digital image processing. A commonly used color gain ratio is: $Gain_{Blue}=1.4*Gain_{Green}$ and $Gain_{Red}=1.2*Gain_{Green}$.

FIG. 1 shows circuit 100, which exemplifies a conventional architecture for color equalization in a CMOS APS array. Circuit 100 can be implemented as integrated circuitry on a chip. Pixel array 110 is a row/column array with M rows and N columns of pixels. As illustrated, pixels 112 and 114 are both in one of the columns, and both provide signals through line 116, the readout line for the column.

Sample-and-hold (S/H) array 120 receives signals from array 110 on N lines, one for each column. In response to digital control signals, each column's signals are stored temporarily in an S/H cell for the column, as illustrated by S/H cell 122, and are provided to N:1 multiplexer 124 through N lines. Multiplexer 124 also receives Address [0-9], a 10 bit address identifying one of the N columns, and responds by providing the output of the identified column's S/H cell as output. In the illustrated implementation, S/H cell 122 stores two values, a signal value and a reset value, both of which are provided at the output of multiplexer 124.

Variable gain amplifier 130 receives a column's signal and reset values and performs color gain equalization by providing an appropriate gain for each pixel based on the color the pixel senses. The gain can, for example, multiply a column's signal and reset values by a factor between 1 and 16, and can be applied in a series of steps.

Analog-to-digital converter (ADC) S/H amplifier 132 temporarily stores color equalized signal and reset values from amplifier 130, allowing ADC 134 to convert the signal and reset values into digital values, illustratively on N parallel lines. ADC 134 can be implemented as a pipeline ADC block.

The invention addresses problems with these and other readout techniques.

BRIEF SUMMARY OF THE INVENTION

The invention provides circuits, methods, and systems in which a capacitance that receives signals from light sensing pixels or other sensing elements is varied. The capacitance can, for example, vary in accordance with color sensed, with conversion efficiency, with readout signal range, or with other readout characteristics of sensing elements. Capacitance can be varied to perform color equalization at the input of a readout path.

Additional advantages and features of the invention will be apparent from the following detailed description and drawings.

DETAILED DESCRIPTION OF THE INVENTION

The following detailed description refers to the accompanying drawings, which form a part hereof and which show by way of illustration specific implementations of the invention. These implementations are described in sufficient detail to enable those skilled in the art to practice the invention, and it is to be understood that other implementations may be utilized and that structural, logical, and electrical changes may be made without departing from the spirit and scope of the invention. The following detailed description is, therefore, not to be taken in a limiting sense, and the claims indicate the scope of protection sought.

Figure 1:
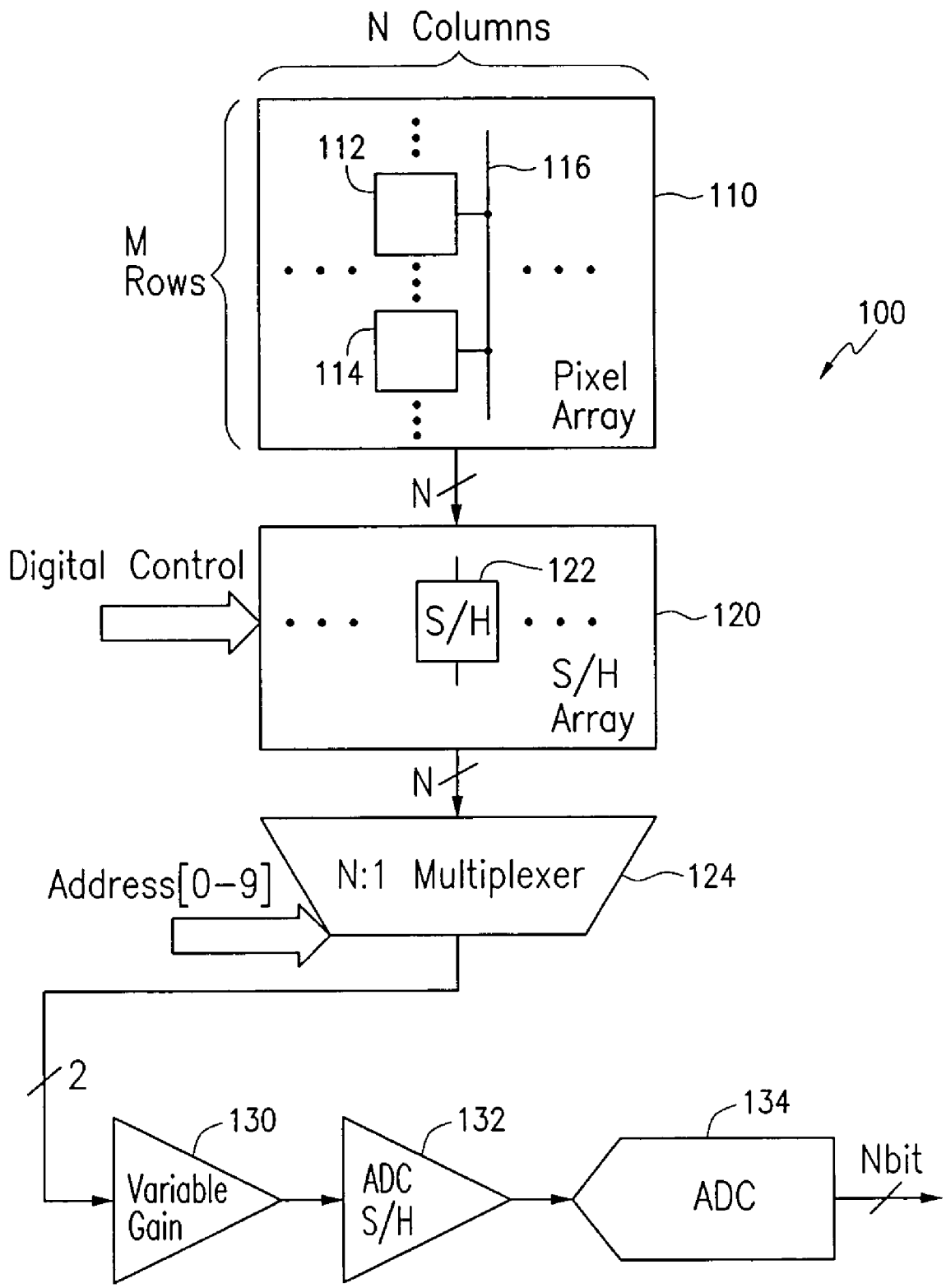
FIG. 1 is a schematic circuit diagram of a conventional architecture for color equalization in a CMOS APS array.
Figure 2:
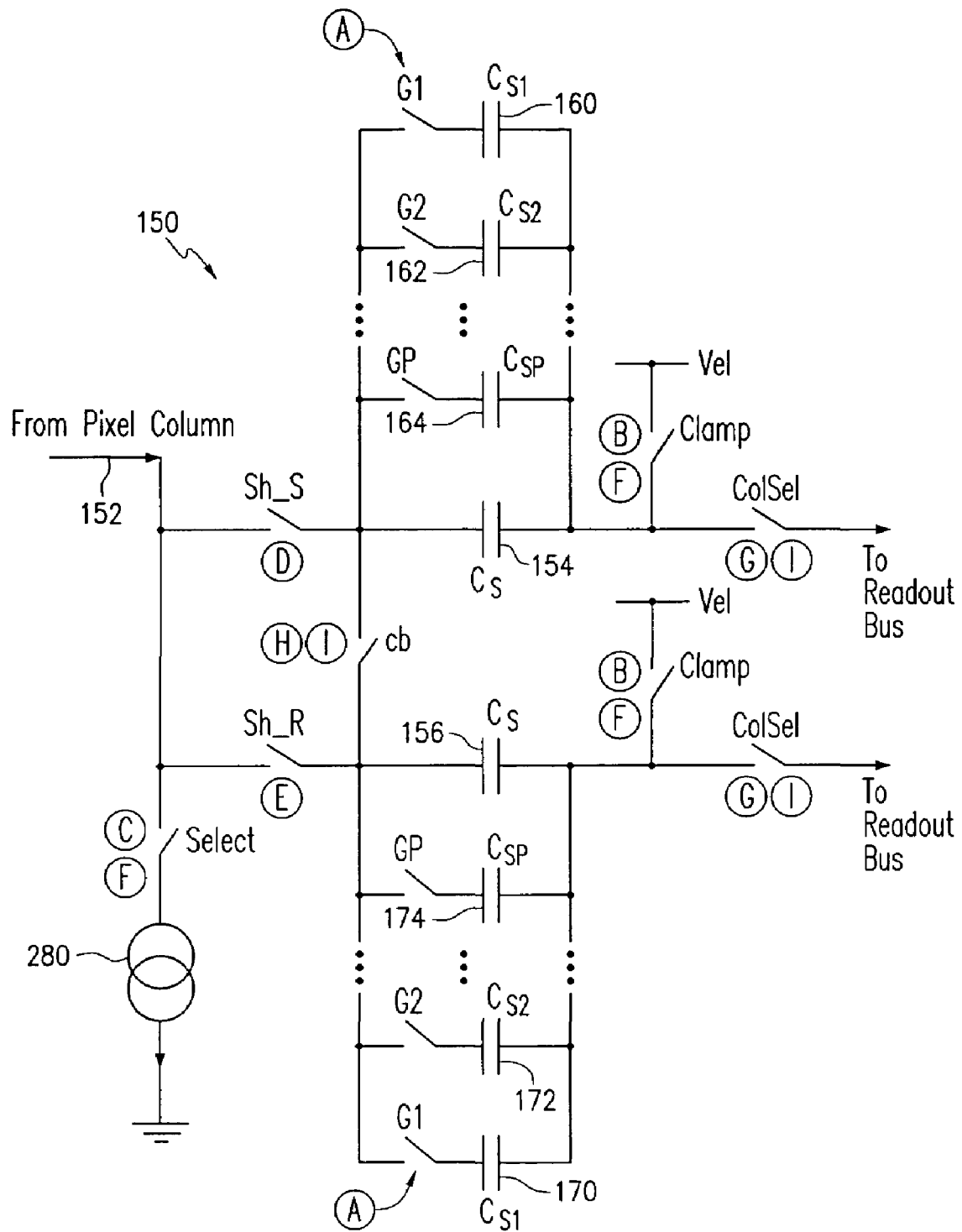
FIG. 2 is a schematic circuit diagram showing a variable capacitance component that can receive signals from a readout line.

FIG. 2 shows circuit 150, a new column S/H cell that can replace conventional S/H cell 122 in circuit 100 in FIG. 1 or can be used in other circuits in which two or more sensing elements provide signals through a shared readout line. For example, in a row/column array, a "row" is defined as a line of pixels that can be concurrently selected for readout, while a "column" is defined as a line of pixels that provide their signals through a shared readout line, also referred to as a "column line". While its row is selected, each pixel in a column can provide signals through its column line, such as line 152 in FIG. 2. The invention is also applicable, however, to other arrays and configurations in which light sensing pixels or other sensing elements share readout lines.

Circuit 150 addresses problems that affect conventional color equalization techniques like that described in relation to FIG. 1, but similar problems could arise in other contexts in which sensing elements share a readout line. Different sensing elements provide signals with different characteristics, such as different ranges, and the signals are therefore affected differently by amplification and other operations along a readout path.

In particular, pixels that sense different colors provide signals in significantly different ranges, as noted above. But if gain is not adjusted until downstream, such as by a variable gain amplifier that boosts signals after one or more preliminary stages, most of the gain available will be needed to boost the color with the lowest QE, such as blue, leaving less gain available to boost colors with higher QE, such as red or green. If blue pixels have half the QE of green pixels, for example, and the variable gain amplifier could be set to gain levels from 1 through 8, all eight levels could be used to boost a blue pixel's signal, but only the levels from 1 through 4 would be available to boost a green pixel's signal.

Also, unless equalization is applied before signals are amplified, signal-to-noise ratio (SNR) will be undesirably reduced. In theory, color equalization can be performed by changing the gain for each color at any point along the readout path, in the analog or digital domain. Although the digital approach may be of interest because it allows higher precision with lower power consumption, the analog approach allows gain adjustment of the analog signal chain, directly changing the SNR of the amplified pixel signal. And, as between different analog techniques, the best image quality would be obtained with the one providing higher SNR. The highest possible SNR is obtained by changing gain equalization at the first stage, before amplification. For example, in FIG. 1, variable gain amplifier 130 undesirably reduces SNR for signals with different ranges.

Circuit 150 alleviates these problems by allowing equalization of signals at the point where they enter the readout path. Specifically, in circuit 150, capacitances that receive signals from a readout line can be varied in accordance with readout characteristics. The signals are therefore equalized by scaling before variable gain amplification or other operations on the readout path, allowing any additional equalization to use all available levels of gain for all colors. For example, capacitances can be varied so that blue pixel signals are in the same range as red and green pixel signals at the beginning of the readout path. This technique can be more power efficient because a variable gain amplifier need not be operated to its frill gain to equalize and boost blue pixel signals. This technique also maintains higher SNR and therefore image quality.

As used herein, the term "readout characteristic" encompasses any characteristic of a sensing element or its signal that results in or indicates a difference between signals of different sets of sensing elements. For example, color sensed is a characteristic of a pixel that results in signal differences. More generally, QE or other conversion efficiency is a characteristic of a sensing element that results in such differences, including differences due to color sensed. And readout signal range is a signal characteristic that indicates a difference between signals of different sensing elements. Capacitance can be varied in accordance with these and various other readout characteristics within the scope of the invention.

Circuit 150 includes signal sampling circuitry and reset sampling circuitry, shown respectively in the upper and lower halves of FIG. 2. Each half includes P+1 capacitors connected in parallel, including a constant capacitor 154 or 156 with value $C_s$ and also including P switchable capacitors. Capacitors 160, 162, through 164 are for signal sampling and capacitors 170, 172, through 174 are for reset sampling. The switchable capacitors have values $C_{Si}$ for i=1 to P, and each can be switched by a respective switch labeled Gi for i=1 to P. In other words, capacitor $C_{Si}$ can be included in the signal sampling capacitance $C_{SS}$ and the reset sampling capacitance $C_{RS}$ by closing the switches labeled Gi, and can similarly be omitted from $C_{SS}$ and $C_{RS}$ by opening switches Gi.

By appropriate operation of switches Gi, the values $C_{SS}$ and $C_{RS}$ can have the effect of providing equalization gain for signals from sensing elements with different readout characteristics, such as elements that sense different colors. For example, if a variable capacitance as described is followed by a charge amplifier with feedback capacitance $C_f$, equalization gain at the amplifier output will be Gain= $(C_S+C_{Si})/C_f$, where the summation is taken only over a selected group of capacitors $C_{Si}$ whose switches Gi are closed.

Figure 3:
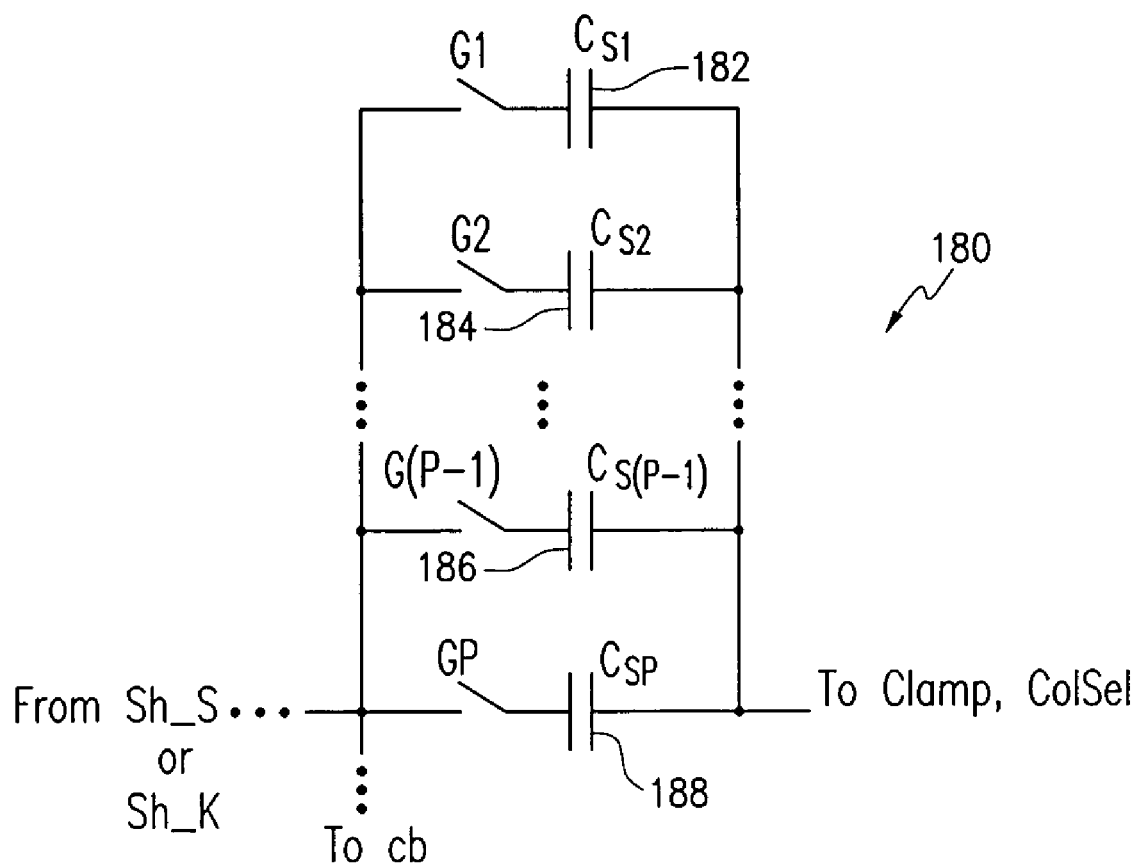
FIG. 3 is a schematic circuit diagram showing an alternative variable capacitance for a component as in FIG. 2.

Capacitance can be varied in numerous ways, but it is desirable to be able to match capacitance to the necessary equalization, preferably to obtain precise gain control. For a CMOS sensor array, it is also desirable to minimize sensor fixed pattern noise (FPN) resulting from differences between sampling capacitors across the array, sometimes referred to herein as "mismatch". If an array of sample and hold capacitors are mismatched, and if the capacitor values determine the gain of a charge amplifier in accordance with Gain=$C_S/C_f$, each column will have a slightly different gain, making it appear as if each column has slightly differently intensity. As capacitors for a CMOS array become smaller, it becomes more difficult to avoid mismatch because a small error in area can significantly affect a small capacitor's value. FIGS. 2 and 3 illustrate strategies for sizing adjustable capacitance $C_{Si}$ to obtain precise gain control and alleviate the mismatch problem.

In one implementation of circuit 150, switchable capacitors $C_{Si}$ can all be approximately equal. In this case, the equalization gain step is uniform across its linear range and its value is set by the size of $C_{Si}$ which can be a small value. This approach is advantageous because any mismatch error in the value of adjustable capacitance $C_{Si}$ is linearly summed in obtaining the converted signal. A trade-off occurs between fine gain control and capacitor matching, since a small gain step requires a small value for $C_{Si}$, increasing possible FPN because of the small size of the capacitors.

In another implementation of circuit 150, switchable capacitors $C_{Si}$ can follow a binary format, approximating values such as $C_{Si}=C_{S0}/2^{i-1}$. This allows for more precise selection of equalization gain, because the gain increment is scaled in a binary format rather than being uniform. On the other hand, it becomes increasingly difficult to avoid mismatch between capacitors across the range of values, increasing possible FPN across the array of capacitors for all columns.

While a conventional fixed storage capacitor used in S/H cell 122 in FIG. 1 could be implemented for a given application with a value between 0.5 to 1.0 pF, circuit 150 in the same application could be variable between approximately 0.2 and 4.0 pF. Other variable capacitance ranges could readily be obtained using the same or similar techniques.

In operating circuit 150, signal sampling capacitance $C_{SS}$ and reset sampling capacitance $C_{RS}$ necessary to equalize signals from different pixels are selected by closing an appropriate subset of switches Gi. Then each capacitance is precharged to voltage Vcl by closing the Clamp switches. Bias current is applied by closing the Select switch. Signal and reset sampling are performed, respectively, by closing and then opening the Sh_S and Sh_R switches. During sampling, the capacitance values selected by switches Gi equalize the sampled and held values. While the Col Sel switches are closed to read out the values held by the capacitances, the cb (or crowbar) switch is closed to force common mode signals through an amplifier. Operation of circuit 150 is described in greater detail below in relation to FIG. 5.

FIG. 3 illustrates another implementation of circuitry 150 that omits constant capacitors 154 and 156 in FIG. 2. Circuitry 180 includes P switchable capacitors connected in parallel, capacitors 182, 184, 186, through 188. The switchable capacitors all have approximately an equal value $C_{Si}$ for i=1 to P, and each can be switched by a respective switch labeled $G_i$ for i=1 to P. One instance of circuitry 180 could replace the signal sampling capacitors in circuit 150, providing signal sampling capacitance $C_{SS}$, and another could replace the reset sampling capacitors, providing reset sampling capacitance $C_{RS}$.

As in FIG. 2, the value of $C_{SS}$ and $C_{RS}$, and therefore the equalization gain, results from closing or opening the switches labeled Gi to include or omit each capacitor $C_{Si}$. Therefore, the equalization gain increment is nearly uniform across its linear range. Advantageously, less mismatch occurs among sampling capacitors across the array because each capacitor $C_{Si}$ is larger than in an implementation with a large constant capacitor. For example, adjustable capacitance $C_{Si}$ could include 10 capacitors, and the gain increment available for equalization would be 1/10 the maximum value of $C_{Si}$. As above, any mismatch of one of the capacitors $C_{Si}$ within a selected group is partially averaged, reducing its effect.

Figure 4:
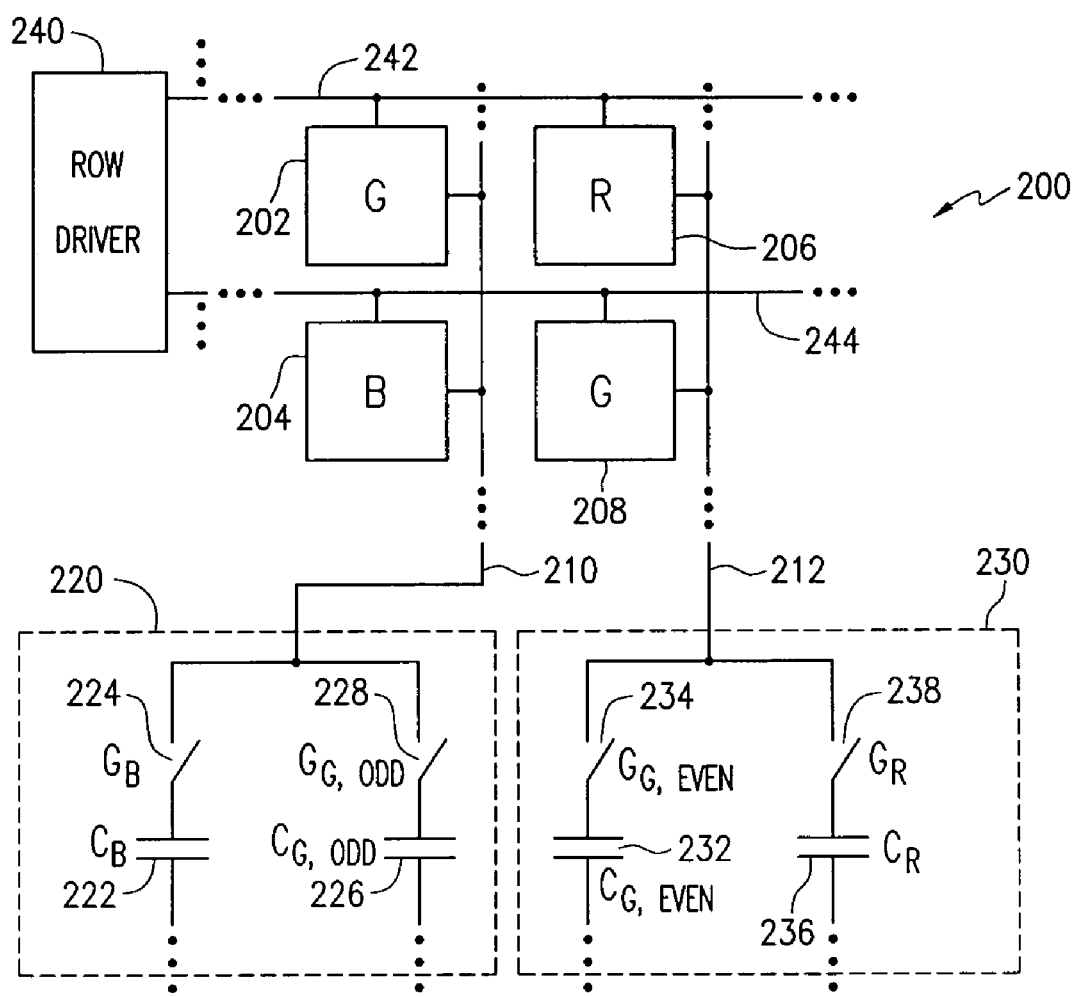
FIG. 4 is a schematic circuit diagram showing how capacitances on readout lines can be varied in accordance with colors received by light sensing pixels in a Bayer pattern.

Circuit 200 in FIG. 4 illustrates in summary form how capacitance can be varied in accordance with a readout characteristic of light sensing pixels, in this case sensed color which, as discussed above, entails different QE and therefore different readout signal ranges. Pixels 202, 204, 206, and 208 exemplify an RGB Bayer pattern in which each row includes at most two of the three possible colors and, within each row, the two pixel colors alternate regularly. As a result, the Bayer pattern repeats itself every second pixel, and the pixels in each odd column alternate regularly between one pair of pixel colors (e.g. green and blue as illustrated by pixels 202 and 204, respectively) while the pixels in each even column alternate regularly between another (e.g. red and green as illustrated by pixels 206 and 208, respectively).

Although the illustrated implementation is highly suitable to the Bayer pattern, application to any other sensing pattern for images in the visible or invisible radiation spectra or for other input energy sources would be within the scope of the invention, whether or not implemented with odd and even columns as described above. Examples of other possible applications include infrared, ultraviolet, and x-ray image sensing; sensing of different radiation polarities or directions; or sensing of any other input energy with several separately sensed forms, with or without filtering or diffraction. A particular advantage of the technique of FIG. 4, however, is that oily two sets of capacitance values are required, one for odd columns and one for even columns, simplifying the control signals.

Signals from the odd column that includes pixels 202 and 204 are provided through column line 210, while signals from the even column that includes pixels 206 and 208 are provided through column line 212. Column line 210 is connected to variable capacitance component 220, within which blue pixel capacitance 222, with value $C_B$, can be connected by switch 224, designated $G_B$, and green pixel capacitance 226, with value $C_{G,Odd}$, can be connected by switch 228, designated $G_{G,Odd}$. Similarly, column line 212 is connected to variable capacitance component 230, within which green pixel capacitance 232, with value $C_{G,Even}$, can be connected by switch 234, designated $G_{G,Even}$, and green pixel capacitance 236, with value $C_R$, can be connected by switch 238, designated $G_R$.

It will be understood that, in implementations like those in FIGS. 2 and 3, each color's capacitance would be obtained by connecting an appropriate combination of one or more parallel switched capacitors rather than always by closing a single switch as in FIG. 4. The technique of FIG. 4 is not, however, limited to parallel switched capacitors. More generally, capacitance can be varied in many ways besides those shown in FIGS. 2-4, including other combinations of parallel switched capacitors; switching configurations other than purely parallel capacitors, including appropriate serially connected capacitors; and variable capacitances of other types, such as a varactor or other device formed from a PN junction whose capacitance depends on bias voltage.

During readout, digital control signals can be provided to switches 224, 228, 234, and 238 and also to row driver 240 so that capacitance is varied in accordance with sensed color. When row driver 240 provides a row select signal on line 242, causing pixels 202 and 206 to provide signals, switches 228 and 238 can be closed so that the signals are received by capacitances 226 and 236. Similarly, when row driver 240 provides a row select signal on line 244, causing pixels 204 and 208 to provide signals, switches 224 and 234 can be closed so that the signals are received by capacitances 222 and 232.

The values of capacitances 222, 226, 232, and 236 can be related in accordance with the QE for each color, with the value of $C_B$ the greatest, to provide greatest gain, and $C_{G,Odd}$ and $C_{G,Even}$ the least. Another particular advantage of the technique of FIG. 4 is that signals from all three colors can be equalized into approximately the same signal range at the input of the readout path, optimizing SNR. More generally, however, capacitances could be chosen to satisfy any appropriate constraint without departing from the scope of the invention.

Figure 5:
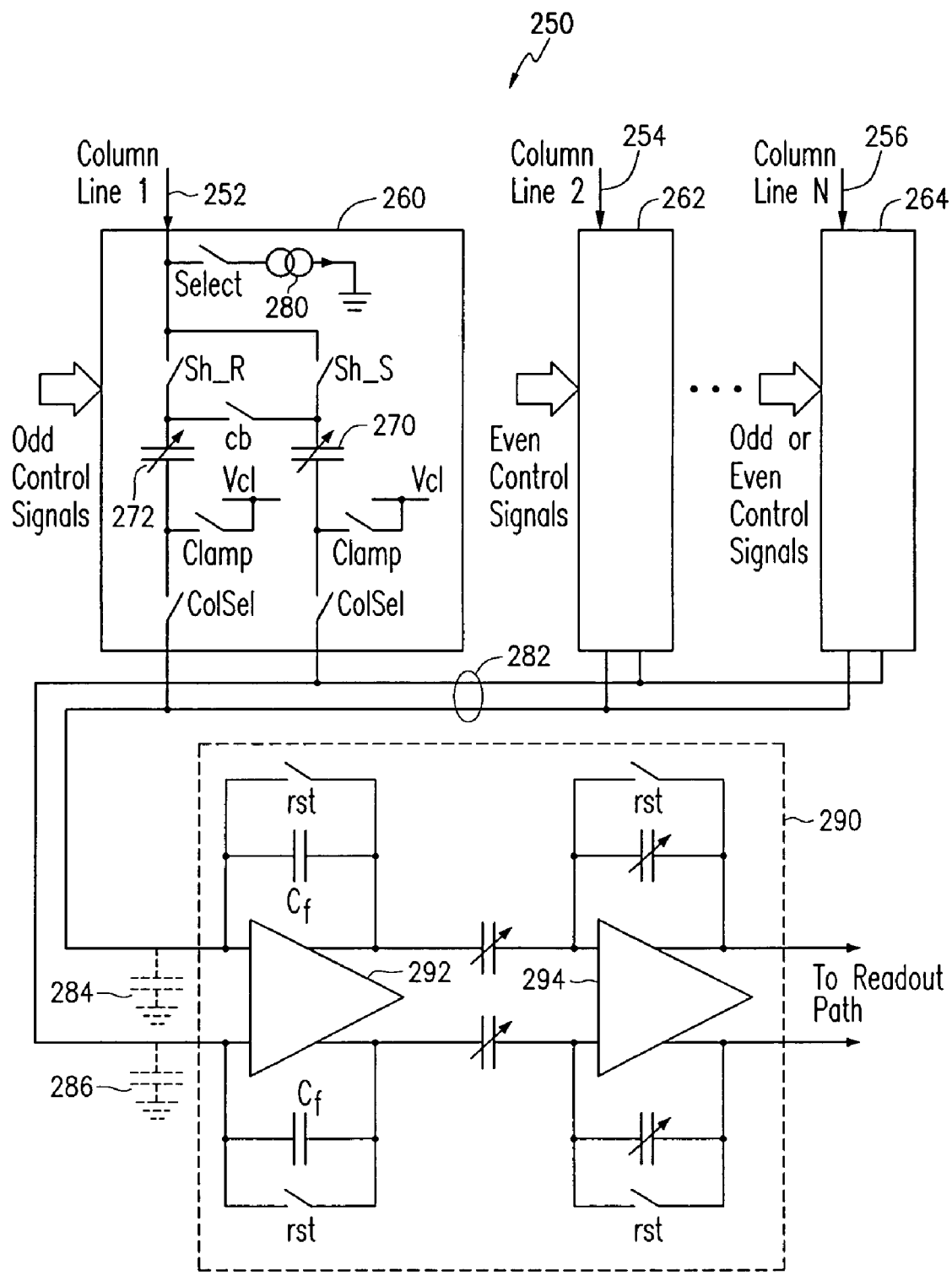
FIG. 5 is a schematic circuit diagram showing readout circuitry that includes variable capacitance components.

FIG. 5 illustrates how an array of circuits with features as in FIGS. 2-4 can be connected to provide readout circuitry 250 for an image sensor array. Column lines 252, 254, through 256 from the array provide signals received by variable capacitance components 260, 262, through 264, each of which can be implemented as shown in detail within component 260.

In component 260, variable capacitance 270 receives signals from column line 252 during signal sampling, while variable capacitance 272 receives during reset sampling. As shown, operations of component 260 are determined by odd control signals, operations of component 262 by even control signals, and operations of component 264 by odd or even control signals, depending on whether N, the number of columns, is odd or even. Therefore, only two sets of control lines are necessary, distributed among the columns, one for odd columns and one for even columns.

Switches in component 260 are labeled similarly to those in FIG. 2, and one way they can be operated to receive a pixel's signal can be understood from circled labels A through I in FIG. 2: Before sampling time for the pixel's row, the actual value of the sampling capacitance can be updated by closing an appropriate subset of switches G1-GP in both the upper and lower sides of circuit 150 to connect the appropriate capacitances $C_{Si}$, as indicated by labels A. For example, a blue pixel can have a larger sampling capacitance value than a green pixel, to provide a higher signal gain during readout. The readout side of each sampling capacitance, at right in FIG. 2, can then be precharged to a voltage Vcl by closing the upper and lower Clamp switches, at labels B, which also serves to zero out any residual charge on the capacitors so that the capacitors will see the true input signal. Finally, current source 280 can be connected to column line 152 by closing the Select switch, at label C, so that circuit 150 is ready for sampling.

For delta sampling as with a rolling shutter technique, sampling can begin after the pixel's row select line is activated, allowing the pixel to provide a signal through column line 152. First, the Sh_S switch, at label D, is closed for an appropriate sampling period such as 1 μsec, then opened, to store a signal value in the signal sampling capacitance on the upper side of circuit 150. After the Sh_S switch is opened, the pixel's row is reset. Then, for sampling the pixel's reset state, the Sh_R switch, at label E, is closed for the same sampling period, then opened, to store a reset value in the reset sampling capacitance on the lower side of circuit 150. After sampling is completed, the pixel's row select line is deactivated Sampling could also be performed in other ways, such as by first obtaining a reset sample, then a signal sample, appropriate with some frame shutter techniques. In any case, samples can be obtained concurrently for all the pixels in a row.

When the sampling phase is completed, the sampled values are held in the signal and reset sampling capacitances for all columns in an array. During this hold phase, the Select and Clamp switches are opened, at labels F.

During a readout phase, the columns' sampled values are read out in sequence, with one column read out per clock cycle. During its clock cycle, each column's sampled values are connected to readout bus 282 by closing the column's Col Sel switches, at labels G. The Col Sel switches can be closed in response to Address [0-9] from a decoder, as with multiplexer 124 in FIG. 1. After an appropriate interval, the cb switch (also referred to as a crowbar switch) is closed, at label H, causing the input sides of the sampling capacitances, at left in FIG. 2, to equalize so that a common mode signal occurs on readout bus 282 and charge is forced through amplifier 292. Then, before the column's clock cycle ends, the Col Sel and cb switches are opened, at labels I.

When all columns have been read out, control signals can be provided to prepare for readout of another row of the array. If implemented with the Bayer pattern illustrated in FIG. 4, and if pixel rows are sampled in order across the array, capacitances must be updated before each pixel row is sampled, either from green to blue or red or from blue or red to green. But various other patterns of pixels or other sensing elements could be used, and sampling of various types could be performed in any appropriate sequence of rows and columns to obtain improved results for a particular application.

Readout circuitry 250 addresses a problem that arises in amplifying signals after sampling by variable capacitances as in FIGS. 2-4. Signals on readout bus 282 are provided to a readout path that can begin with a charge amplifier and continue with analog-to-digital conversion, as in FIG. 1. Specifically, noise can be introduced by switches, lines, and other components through which capacitances are connected to a first stage amplifier.

Readout circuitry 250 partially alleviates this problem by avoiding unnecessary components between capacitances 270 and 272 and the first stage amplifier. But even in readout circuitry 250, Col Sel switches have parasitic capacitances that can adversely affect operation of the first stage amplifier. Each Col Sel switch might have 5-10 fF of capacitance to ground, which would be multiplied by the number of columns on each readout bus line to obtain total parasitic capacitances 284 and 286 in FIG. 5.

Readout circuitry 250 further includes circuitry to alleviate noise from intermediate components by blocking parasitic effects. Specifically, charge amplification circuitry 290 includes buffer amplifier 292 and variable amplifier 294, each with signal and reset inputs, signal and reset outputs, and a feedback capacitor and rst switch across each input/output pair. Buffer amplifier 292 blocks parasitic capacitances 284 and 286 from producing downstream effects. In addition, variable amplifier 294 can perform further color equalization gain as appropriate, similar to the function of variable gain amplifier 130 in FIG. 1.

Buffer amplifier 292 is a unity gain amplifier whose feedback capacitors can each have the value $C_f$. Its gain for a specific color can be expressed as:

$$\text{Gain}_{color} = C_{color}/C_f$$

where $C_{Color}$ has the value determined by switches G1 through GP. During readout with circuitry 150 in FIG. 2, $C_{Color} = C_S + {}_iC_{Si}$. For a row of a Bayer pattern array as in FIG. 4, $C_{color}$ has one value for even columns and another for odd columns, because ${}_iC_{Si}$ has a different value for an odd column than for an even column. This provides a mechanism for variable capacitances to equalize signal gain from pixels of different colors at the output of amplifier 292, before variable amplifier 294 provides global gain.

The signal gain of amplifier 292 is not affected by parasitic capacitances 284 and 286, meaning that they are blocked. Its speed and noise performance can, however, be affected, meaning that more power may be necessary to meet a given speed requirement. It is important to allocate enough bandwidth for amplifier 292 to avoid any degradation of its settling time when gain is changed from one color to the next. With circuitry as shown in component 260, gain equalization typically necessitates changing the sampling capacitance by not more than 100%, while amplifier feedback capacitor $C_f$ is kept constant. This is highly advantageous, considering that parasitic capacitances 284 and 286 are always as large as $C_f$. In other words, the overall effect of gain equalization on amplifier bandwidth has little impact because the feedback factor 1/B is weighted by $C_f$.

Without gain equalization by varying capacitance, i.e. with constant $C_S$, we obtain the feedback factor:

$$1/B_{no\ equalization} = (C_S + C_f + C_p)/C_f$$

where $C_p$ is the parasitic capacitance.

But replacing constant $C_S$ by variable $C_S + C_S$, we obtain the feedback factor:

$$1/B_{equalization} = (C_S + C_S + C_f + C_p)/C_f = (1/B_{no\ equalization}) + (C_S/C_f),$$

with $C_S + C_f + C_p > C_S$. Therefore, even though equalization increases feedback factor and, consequently, the power necessary for a given bandwidth, the increase is not large.

Buffer amplifier 292 is one of a number of techniques that could be used to block parasitic capacitances, and other blocking techniques could be used to block other undesirable noise sources, all within the scope of the invention. Furthermore, a variety of other amplification techniques could be used. But buffer amplifier 292 is especially advantageous in an implementation like that of FIG. 5, because it takes full advantage of variable capacitances on its input side by efficiently performing charge mode readout at unity gain. Alternatively, an equivalent amplifier with variable feedback capacitance could be used, but would consume more power.

Variable amplifier 294 can be adjusted in a conventional manner by changing input capacitors 296 and feedback capacitors 298 for each pixel's color so that amplification circuitry 290 provides variable gain to equalize colors. As a result, variable amplifier 294 can provide any additional equalization that is necessary after initial equalization by varying capacitance.

In operation, the rst switches can be closed to allow amplifiers 292 and 294 to balance readout bus 282 until a column's Col Sel switches are closed. Then, the rst switches can be opened before closing the cb switch, at label I in FIG. 2.

Readout circuitry 250 is particularly advantageous because it varies input capacitance of amplifier 292 to change gain equalization at the first stage of the analog signal chain rather than at a later point in the readout path. Due to QE differences described above, a green pixel's readout signal range is initially larger than a red pixel's range and significantly larger than a blue pixel's range. But readout circuitry 250 can provide sufficient gain that all three colors have the same readout signal range at the output of amplifier 292. As a result, signals from all three colors can male use of the full gain available from amplifier 294 and, in general, are affected similarly by the components in the readout path. Also, as noted above, the highest possible SNR is obtained by changing gain equalization at the first stage, as is done by readout circuitry 250. This advantage is especially important for CMOS image sensor arrays, because they typically provide weak, noisy signals.

Finally, although gain of amplifier 292 could be changed by varying input capacitance or feedback capacitance, linear gain variation is more easily obtained by varying input capacitance.

Although particularly suited for integration on a substrate with a CMOS image sensor array as described below, capacitances and switches as in FIGS. 2-5 could be implemented with any appropriate structures, including capacitors and switching transistors of any suitable type formed with layers of semiconductor material on any appropriate substrate. Implementation with an absorption medium on a separate chip, connected for example by a Ge or GaAs flip chip connection, would also be within the scope of the invention.

Figure 6:
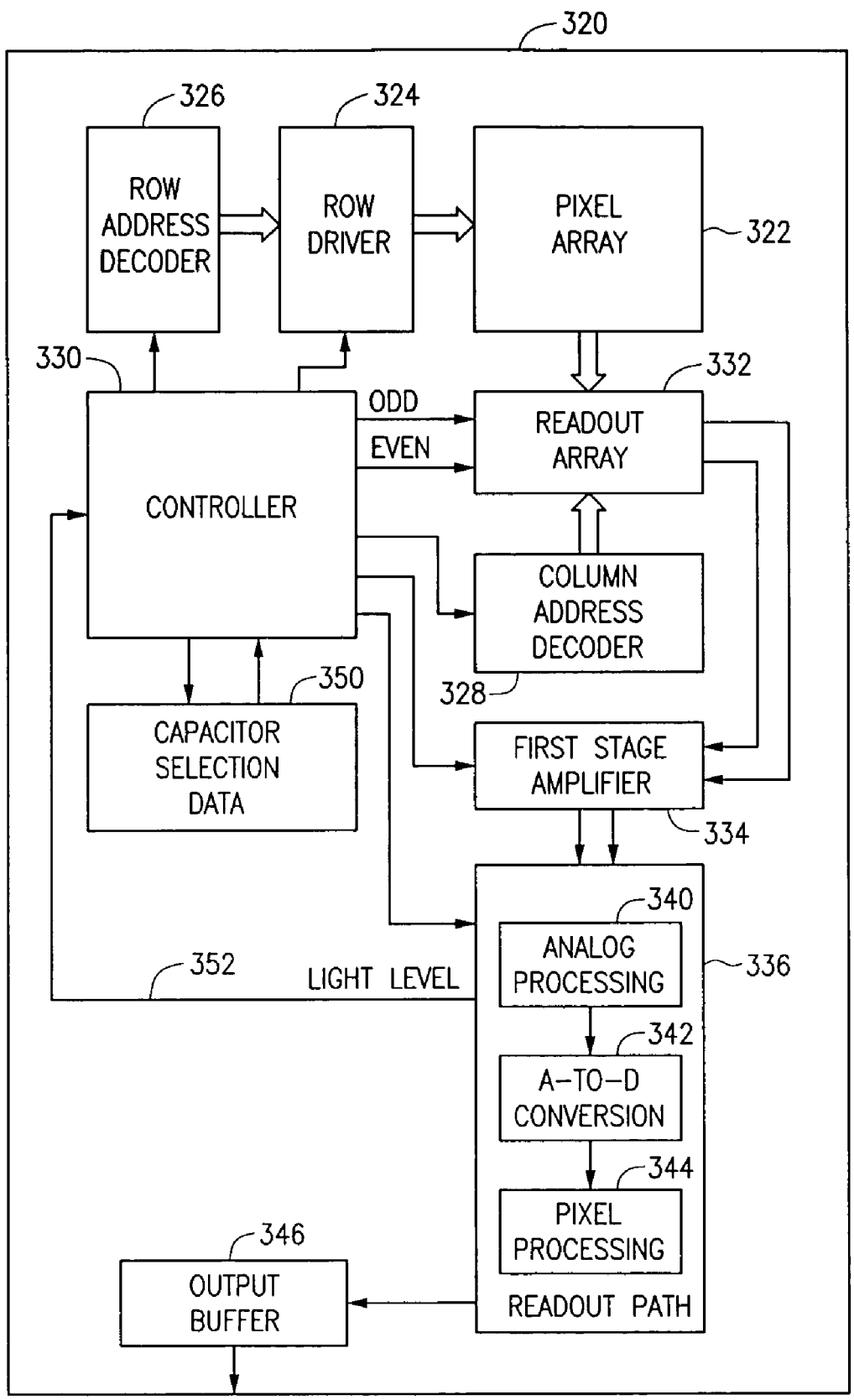
FIG. 6 is a schematic block diagram showing components on a chip, including readout circuitry as in FIG. 5.

FIG. 6 shows chip 320 on which readout circuitry as in FIG. 5 can be implemented as part of an integrated image sensor circuit. Pixel array 322 can be implemented as a CMOS image array as described in U.S. Pat. No. 6,204,524 ('524), incorporated by reference. Row driver 324, row address decoder 326, and column address decoder 328, can also be implemented as described in '524. Controller 330, which functions as a state machine providing timing and control signals to other components, can in part provide timing and control signals as described in '524, though it also provides other signals as described below.

Readout array 332 can be implemented as described above in relation to variable capacitance components 260, 262, through 264 in FIG. 5. Column address decoder 328 performs N:1 multiplexing by providing signals to open and close the Col Sel switches. In response, signals from variable capacitances 270 and 272 are transferred to first stage amplifier 334, which can be implemented as described above in relation to charge amplification circuitry 290 in FIG. 5. Output signals from amplifier 334 continue through readout path 336, which can include analog processing circuitry 340, analog-to-digital (A-to-D) conversion circuitry 342, and pixel processing circuitry 344. Pixel processing circuitry 344 can receive digital values, correct defective pixels, and perform color interpolation and other digital image processing. Pixel processing circuitry 344 and controller 330 could both be implemented on a simple microprocessor on chip 320. Signals from chip 320 are ultimately transferred from output buffer 346 to an external computer system or other external circuitry, such as through appropriate pin connections.

Controller 330 provides signals to switches in readout array 332 as described in relation to circled labels A through I in FIG. 2. In addition, controller 330 provides signals to rst switches in amplifier 334 as described above.

In providing signals to readout array 332, controller 330 accesses capacitor selection data 350, illustratively shown as a separate component, to obtain information indicating which capacitors to select. Controller 330 then provides signals selecting the indicated capacitors, which in combination provide appropriate values of variable capacitances 270 and 272. Capacitor selection data 350 could indicate, for example, which of switches G1 through GP in FIGS. 2 or 3 should be closed in reading out pixels that sense each of the primary colors.

Capacitor selection data 350 could be implemented as a lookup table or as any other suitable data stored in any appropriate memory device, as data encoded in any other appropriate hardware structure, as values of variables embedded in instructions executable by a processor within controller 330, or in any other appropriate way. Values that determine capacitor selection data 350 could be obtained similarly to the ways that color equalization gain is conventionally obtained. For example, after chip 320 is manufactured and controller 330 is programmed, one or more images could be read by chip 320 and the output could be compared with a desired output to obtain equalizing capacitance values, which could then be used to obtain capacitor selection data. Or controller 330 or other circuitry-on chip 320 could execute encoded instructions enabling on-chip operations to similarly obtain capacitor selection data 350, or to modify capacitor selection data 350 in response to a request for a specified gain for each color.

In addition, chip 320 addresses a problem that arises when color equalization is performed across a broad range of light conditions. Viewing an image as a combination of color planes, the techniques discussed above equalize colors by applying a slightly different gain to pixels belonging to different color planes, with a higher gain selected for pixels in the blue plane and a lower gain for pixels in the green plane. In general, applying a fixed gain to each color plane causes problems as light conditions change, because QE of different colored pixels does not change proportionally with changing light conditions.

Chip 320 alleviates this problem by adjusting or "fine tuning" gain applied to each color plane depending on light conditions, rather than simply scaling color gain with large numbers. For example, controller 330 can apply a different gain for each color under low light than it applies under high light. With this high precision color equalization approach, uniform white illumination of an image sensor array generates signals that have equalized intensity for each color plane, because any difference of QE is compensated by fine tuning signal gain. High precision color equalization may be especially appropriate for implementations in which parallel switchable capacitors follow a binary format, described above in relation to FIG. 2.

Chip 320 includes level feedback circuitry 352, illustratively a line that provides light level information from A-to-D conversion circuitry 342 or other circuitry in readout path 336 to controller 330. In producing capacitor selection data 350, different sets of equalizing capacitance values could be obtained for each color at each light level. Capacitor selection data 350 could include a lookup table that controller 330 can access with a color and a light level to obtain information indicating which capacitors to select for sensing the color at the light level. During operation, controller 330 could use a pixel's color with light level information from level feedback circuitry 352 to access the lookup table. Controller 330 could then select the indicated capacitors by providing signals to readout array 332 so that fine-tuned equalization is performed.

Fine-tuned equalization of this type could also be performed in many other ways within the scope of the invention. Also, rather than being on a single chip, some circuitry, such as the readout array and readout path, could be provided on one or more additional chips rather than on the same chip with the pixel array, all within the scope of the invention.

Figure 7:
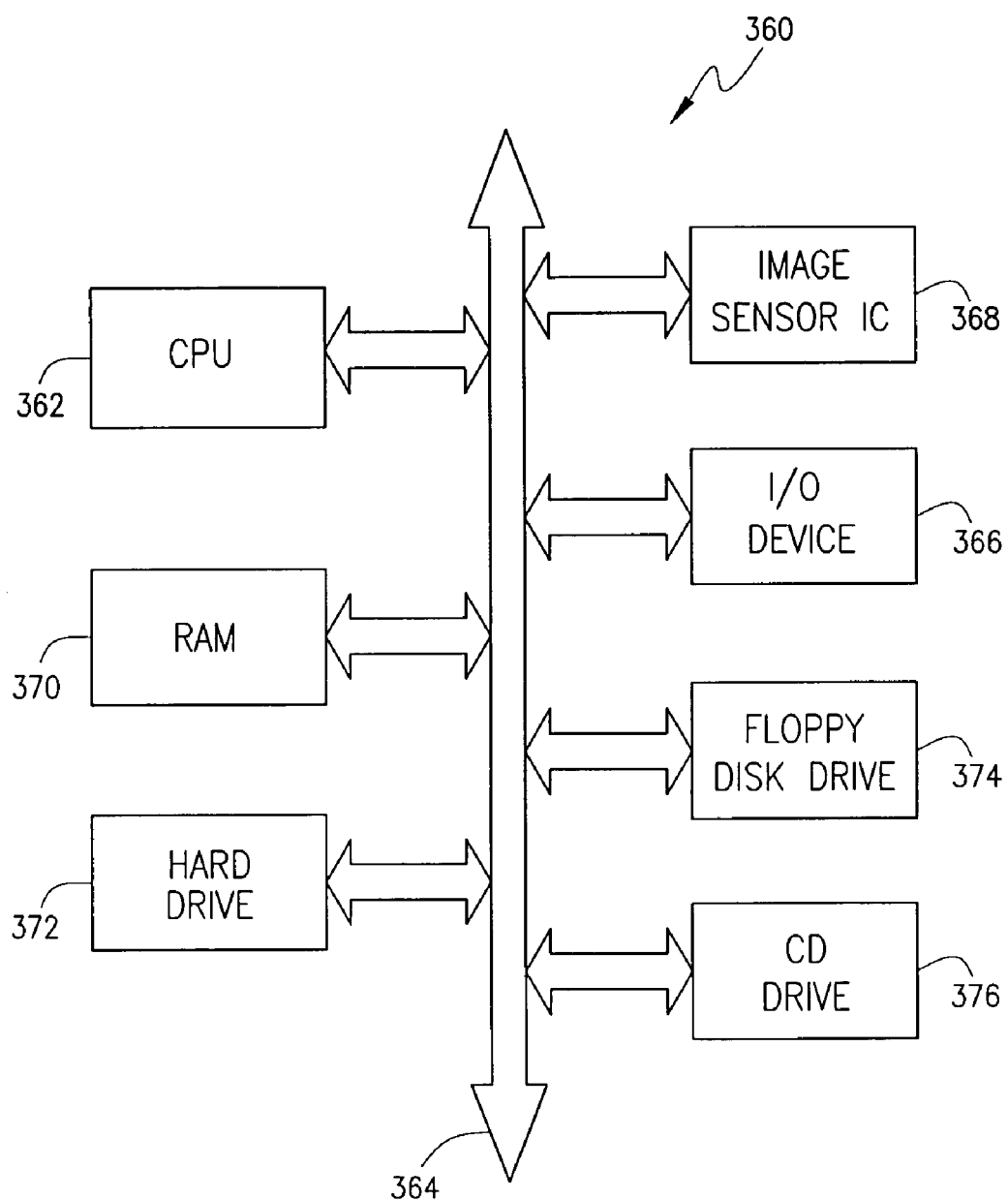
FIG. 7 is a schematic block diagram of a system that includes an image sensor chip with readout circuitry as in FIG. 5.

FIG. 7 shows system 360, a typical processor based system modified to include an image sensor IC as in FIG. 6. Processor based systems exemplify systems of digital circuits that could include an image sensor. Examples of processor based systems include, without limitation, computer systems, camera systems, scanners, machine vision systems, vehicle navigation systems, video telephones, surveillance systems, auto focus systems, star tracker systems, motion detection systems, image stabilization systems, and data compression systems for high-definition television, any of which could utilize the invention.

System 360 includes central processing unit (CPU) 362 that communicates with various devices over bus 364. Some of the devices connected to bus 364 provide communication into and out of system 360, illustratively including input/output (I/O) device 366 and image sensor IC 368. Other devices connected to bus 364 provide memory, illustratively including random access memory (RAM) 370, hard drive 372, and one or more periphe memory devices such as floppy disk drive 374 and compact disk (CD) drive 376.

Image sensor 368 can be implemented as an integrated image sensor circuit on a chip with variable capacitance readout, as illustrated in FIG. 6. Image sensor 368 may be combined with a processor, such as a CPU, digital signal processor, or microprocessor, in a single integrated circuit.

As can be seen by the described implementations, the invention encompasses methods, circuits, and systems that vary capacitance in receiving signals from light sensing pixels or other sensing elements.

Although the invention has been described with specific reference to row/column arrays for image sensing, the invention has broader applicability and may be used in any application where sensing elements with different readout characteristics share a readout line. In general, the technique of varying capacitances is especially advantageous for performing equalization at the beginning of a readout path in applications with charge mode readout to a unity gain amplifier or an equivalent amplifier with variable feedback capacitance. Also, although exemplary variable capacitances have been described and illustrated, capacitance could be varied in many other ways, some of which are mentioned above. Similarly, the methods described above are merely exemplary.

The above description and drawings illustrate implementations that achieve the objects, features, and advantages of the invention, but it is not intended that the invention be limited to any illustrated or described embodiment. Any modification that comes within the spirit and scope of the following claims should be considered part of the invention.

What is claimed as new and desired to be protected by Letters Patent of the United States is:

1. An integrated circuit for sensing images, comprising:
   a row/column array of light sensing pixels in which each column has a readout line for reading out signals;
   an amplifier for amplifying the signals and having a gain depending on the capacitance of the readout line;
   for each column's readout line, a variable capacitance component arranged in series before the amplifier and for varying the capacitance on the readout line; and
   control circuitry for setting the capacitances of the columns' variable capacitance components to values for equalizing signals received from a row of the pixels, the values being based on feedback detected from the signals after amplification by the amplifier.

2. The integrated circuit of claim 1 in which the row/column array is a CMOS image sensing array.

3. The integrated circuit of claim 1 in which each column's variable capacitance component includes:
   a signal sampling set of switchable capacitors connected in parallel; and
   a reset sampling set of switchable capacitors connected in parallel;
   the control circuitry setting the columns' variable capacitance components to values by switching the capacitors.

4. The integrated circuit of claim 3, further comprising:
   capacitor selection data indicating which capacitors to switch in setting the variable capacitance components;
   the control circuitry accessing the capacitor selection data in setting the variable capacitance components.

5. The integrated circuit of claim 3 in which the switchable capacitors in both sets have approximately equal capacitances.

6. The integrated circuit of claim 5 in which each set includes N switchable capacitors with capacitances that are related as $C_0/2^{i-1}$ for i=1, 2, . . . N.

7. The integrated circuit of claim 5 in which the capacitive component further includes:
- a constant signal sampling capacitor connected in parallel with the signal sampling set of switchable capacitors; and
- a constant reset sampling capacitor connected in parallel with the reset sampling set of switchable capacitors.

8. The integrated circuit of claim 1 in which each of the pixels senses one of a set of two or more colors, the control circuitry setting the column's variable capacitance components for color equalization.

9. The integrated circuit of claim 8, further comprising: wherein
- the control circuitry sets the variable capacitance components of the columns so that the amplifier provides amplified signals in approximately the same readout signal range for all colors in the set.

10. The integrated circuit of claim 8, further comprising:
- amplification circuitry for amplifying the received signals from the variable capacitance components, the amplification circuitry having variable gain for further color equalization.

11. An image sensor circuit comprising:
- a readout line for reading out respective signals of connected light sensing pixels;
- an amplifier for amplifying the signals and having a gain depending on the capacitance of the readout line;
- a variable capacitance component arranged in series before the amplifier and for receiving the signals from light sensing pixels through a readout line, the pixels having different readout characteristics, the variable capacitance component being operable to vary the capacitance on the readout line in accordance with the readout characteristic of a pixel providing a signal on the readout line.

12. The circuit of claim 11 in which the variable capacitance component includes:
- a set of switchable capacitors connected in parallel.

13. The circuit of claim 12 in which the switchable capacitors have approximately equal capacitances.

14. The circuit of claim 12 in which the set includes N switchable capacitors with capacitances that are related as $C_0/2^{i-1}$ for i=1, 2, ... N.

15. The circuit of claim 12 in which the capacitive component further includes:
- one constant capacitor connected in parallel with the set of switchable capacitors.

16. The image sensor circuit of claim 11, wherein the variable capacitance component varies the capacitance on the readout line based on feedback detected from the pixel's signal after amplification by the amplifier.

17. An image sensor circuit comprising:
- a readout line for reading out signals from a plurality of light sensing pixels;
- an amplifier for amplifying the signals and having a gain depending on the capacitance of the readout line;
- a variable capacitance component arranged in series before the amplifier and for receiving signals from a sequence of the light sensing pixels through a the readout line, the pixels having different readout signal ranges, the variable capacitance component being operable to vary capacitance on the readout line to provide a capacitance for each pixel in the sequence, the capacitance for each pixel scaling the pixel's signal, the scaled signals of the pixels all having approximately the same range.

18. The circuit of claim 17, further comprising:
- an amplifier connected for receiving signals from pixels through the variable capacitance component; the amplifier's gain for each pixel's signal being determined by the capacitance for the pixel; the amplifier providing the scaled signals as output.

19. The circuit of claim 18, further comprising:
- a switch for connecting the variable capacitance component to the amplifier, the switch having a parasitic capacitance; and
- a readout path that receives the scaled signals from the amplifier;
- the amplifier blocking the parasitic capacitance from reaching the readout path.

20. The image sensor of claim 17, wherein the variable capacitance component varies the capacitance on the readout line based on feedback detected from the pixel's signal after amplification by the amplifier.

21. An integrated circuit for sensing images, comprising:
- a row/column array of light sensing pixels in which each column has a column readout line; each pixel sensing one of a set of two or more colors;
- for each column readout line, a variable capacitance component; and
- control circuitry that, for each row of the array, operates to:
- detect one of a set of light levels;
- set each column's variable capacitance component in accordance with the color sensed by the column's pixel in the row and with the detected light level; and
- receive a signal from each column's pixel in the row in the column's variable capacitance component; the variable capacitance components of the columns being set so that the received signals are scaled into approximately the same readout signal range for all colors in the set and for all of the set of light levels.

22. The integrated circuit of claim 21, further comprising:
- amplification circuitry for amplifying the received signals from the variable capacitance components, the amplification circuitry having variable gain for color equalization.

23. A method of making a chip product, comprising:
- producing integrated circuitry that includes:
- a row/column array of light sensing pixels in which each column has a column readout line; each pixel sensing one of a set of two or more colors;
- for each column readout line, a variable capacitance component; and
- control circuitry that, for each row of the array, operates to:
- detect one of a set of light levels;
- set each column's variable capacitance component in accordance with the color sensed by the column's pixel in the row and with the detected light level; and
- receive a signal from each column's pixel in the row in the column's variable capacitance component; and
- programming the control circuitry to set the variable capacitance components of the columns so that the received signals are scaled into approximately the same readout signal range for all colors in the set and for all of the set of light levels.

24. The method of claim 23 in which programming the control circuitry comprises:
- operating the integrated circuit at each light level in the set to obtain capacitor selection data indicating, for each color in the set and for each of the set of light levels, values of the variable capacitance components that scale the received signals into approximately the same readout signal range; and modifying the integrated circuit to include the capacitor selection data.

25. A CMOS color image sensor array integrated circuit, comprising:

a row/column array of light sensing pixels in which each column has a readout line; each pixel sensing one of red, green, and blue; the pixels being arranged in an RGB Bayer pattern;

for each column's readout line, a variable capacitance component connected for varying capacitance on the line; the variable capacitance component comprising a signal sampling set of switchable capacitors and a reset sampling set of switchable capacitors;

amplifying circuitry at the beginning of a readout path, the amplifying circuitry comprising:

a first amplifier connected for receiving and amplifying signals from pixels through the variable capacitance components; the first amplifier's gain being determined by its input capacitance; and a second amplifier connected for receiving amplified signals from the first amplifier; the second amplifier having variable gain for performing color equalization on the amplified signals;

control circuitry for:

for each row of the array, switching the signal sampling set and the reset sampling set of capacitors for each column's readout line to obtain sampling and reset capacitance values on the line in accordance with the color sensed by the column's pixel in the row and performing signal sampling and reset sampling for the column's pixel in the row; and for each column of the array:

connecting the column's variable capacitance component to the first amplifier so that the sampling and reset capacitance values determine the first amplifier's input capacitance; the sampling and reset capacitance values providing color equalization of the amplified signals; and setting the variable gain of the second amplifier to perform further color equalization on the amplified signals from the first amplifier;

the control circuitry comprising an odd set of control lines for switching sets of capacitors in odd-numbered columns and an even set of control lines for switching set of capacitors in even-numbered columns.

* * * * *

UNITED STATES PATENT AND TRADEMARK OFFICE
CERTIFICATE OF CORRECTION

| | |
|---|---|
| PATENT NO. | : 7,382,408 B2 |
| APPLICATION NO. | : 10/197552 |
| DATED | : June 3, 2008 |
| INVENTOR(S) | : Rossi |

It is certified that error appears in the above-identified patent and that said Letters Patent is hereby corrected as shown below:

On Title page, in Item (57), in "Abstract", column 2, line 2, after "signal" delete ",".

In column 13, line 60, in Claim 17, after "through" delete "a".

Signed and Sealed this

Nineteenth Day of August, 2008

JON W. DUDAS
*Director of the United States Patent and Trademark Office*